United States Patent [19]

Harris

[11] Patent Number: 4,887,733
[45] Date of Patent: Dec. 19, 1989

[54] PRESSURE-RELEASE FUEL CAP
[75] Inventor: Robert S. Harris, Connersville, Ind.
[73] Assignee: Stant Inc., Connersville, Ind.
[21] Appl. No.: 256,182
[22] Filed: Oct. 11, 1988

Related U.S. Application Data

[63] Continuation of 180,142, Apr. 11, 1988, now abandoned which is a continuation-in-part of Ser. No. 129,416, Nov. 25, 1987, Pat. No. 4,765,505, which is a continuation of Ser. No. 42,791, Apr. 27, 1987, abandoned, which is a continuation-in-part of Ser. No. 888,575, Jul. 22, 1986, Pat. No. 4,676,390.

[51] Int. Cl.$^4$ .............................................. B65D 51/16
[52] U.S. Cl. .................................... 220/203; 220/209; 220/303; 220/DIG. 33
[58] Field of Search ....... 220/203, 209, 303, DIG. 32, 220/DIG. 33; 137/315, 493, 493.9

[56] References Cited

U.S. PATENT DOCUMENTS

| | | |
|---|---|---|
| 2,006,752 | 7/1935 | Swank . |
| 2,591,562 | 4/1952 | Levell . |
| 2,792,964 | 5/1957 | Reese et al. . |
| 2,865,531 | 12/1958 | Gorst et al. . |
| 2,964,214 | 12/1960 | Stannard . |
| 2,990,971 | 7/1961 | Enell . |
| 3,082,905 | 3/1963 | Friend . |
| 3,098,636 | 7/1963 | Contella . |
| 3,111,239 | 11/1963 | Ivins . |
| 3,112,840 | 12/1963 | Miller et al. . |
| 3,147,881 | 9/1964 | Friend . |
| 3,163,315 | 12/1964 | Wilson . |
| 3,186,580 | 6/1965 | Previte . |
| 3,203,445 | 8/1965 | McCormick ..................... 137/493.4 |
| 3,373,894 | 3/1968 | Johnson . |
| 3,434,621 | 3/1969 | Previte . |
| 3,587,912 | 6/1971 | Ohta et al. . |
| 3,616,960 | 11/1971 | Miller et al. . |
| 3,703,245 | 11/1972 | Brewer . |
| 3,854,911 | 12/1974 | Walker . |
| 4,036,399 | 7/1977 | Gerdes ................................ 220/303 |
| 4,245,751 | 1/1981 | Neiman ............................... 220/204 |
| 4,271,976 | 6/1981 | Detwiler ............................. 220/206 |
| 4,498,493 | 2/1985 | Harris ................................. 137/469 |
| 4,572,396 | 2/1986 | Kasugai et al. ..................... 220/203 |
| 4,579,244 | 4/1986 | Fukuta ............................... 220/210 |
| 4,588,102 | 5/1986 | Kasugai .............................. 220/203 |
| 4,676,390 | 6/1987 | Harris ................................. 220/203 |
| 4,678,097 | 7/1987 | Crute ................................. 220/288 |
| 4,716,920 | 1/1988 | Crute ................................. 220/203 |
| 4,726,488 | 2/1988 | Kasugai .............................. 220/203 |
| 4,736,863 | 4/1988 | Harris ................................. 220/203 |
| 4,765,505 | 4/1988 | Harris ................................. 220/288 |

Primary Examiner—Jimmy G. Foster
Assistant Examiner—Nova Stucker
Attorney, Agent, or Firm—Barnes & Thornburg

[57] ABSTRACT

A fuel cap is provided for use in a fuel system filler neck having a mouth. The cap includes a closure rotatably engageable with the filler neck to cover the filler neck mouth and formed to include a vent passageway extending therethrough in communication with the filler neck. A valve is supported in the vent passageway for movement between passageway-opening and passageway-closing positions. The cap further includes a handle shell and a plunger. The handle shell includes a lost-motion drive member positioned to apply a rotation-inducing drive force to the closure upon a predetermined amount of rotation of the handle shell. The plunger is supported in a space between the handle shell and the closure for movement between inactive and valve-actuating positions. The handle shell also includes at least one cam member configured to move the plunger to its valve-actuating position upon rotation of the handle shell in a cap-removal direction, thereby moving the valve to its passageway-opening position before the lost-motion drive member is able to rotate the closure relative to the filler neck.

40 Claims, 2 Drawing Sheets

PRESSURE-RELEASE FUEL CAP

BACKGROUND AND SUMMARY OF THE INVENTION

This is a continuation of 180,142, filed Apr. 11, 1988, now abandoned which is a continuation-in-part of U.S. patent application Ser. No. 129,416, filed Nov. 25, 1987, now U.S. Pat. No. 4,765,505, entitled "Delayed Release Fuel Cap," which is a continuation of U.S. patent application Ser. No. 042,791, filed Apr. 27, 1987, now abandoned, which is a continuation-in-part of U.S. patent application Ser. No. 888,575, filed July 22, 1986, entitled "Pressure Release Fuel Cap," now U.S. Pat. No. 4,676,390, granted June 30, 1987.

The present invention relates to fuel caps for closing filler necks of vehicle fuel tanks. More particularly, the present invention relates to a fuel cap that enables fuel vapor to vent from the tank upon rotation of the fuel cap in the removal direction.

Conventional fuel caps for closing the filler neck of vehicle fuel tanks generally include a pressure-vacuum valve located in the cap to control the pressure within the fuel tank. Whenever the pressure within the tank reaches a predetermined superatmospheric level, the pressure valve portion of the pressure-vacuum valve automatically opens to prevent excess pressure build-up. Whenever the pressure within the tank drops to a predetermined subatmospheric level, the vacuum valve portion of the pressure-vacuum valve opens to equalize the pressure in the tank.

The pressure-vacuum valve in a conventional fuel cap must be adjusted so that the potential for some vapor pressure to remain in the fuel tank exists at all times. Generally, the pressure maintained within the fuel tank is in the range of 1-2 psi. This retention of some level of fuel vapor in the tank is desired for several reasons, and normally does not create any problems. However, under certain conditions, pressure from fuel vapor can result in fuel and fuel vapor escaping from the filler neck once the fuel cap is removed. This rapid escape, or surge, of the fuel and fuel vapor from the filler neck after cap removal can result in emission of a potentially dangerous fuel vapor concentration level in the region surrounding the filler neck, as well as the Possibility that the person removing the cap could be injured by hot fuel spray.

With larger fuel tanks now being utilized in many vehicles, and, particularly, with the use of newer, more volatile blends of fuel having higher than normal Reid vapor pressure, more than normal fuel vapor pressure may be generated in these fuel tanks, particularly in warm or hot weather or after the vehicle has been running. Therefore, it would be advantageous to provide a fuel cap that will enable fuel vapor to be vented from the fuel tank sometime during the cap-removal operation, but before the cap is actually removed from the filler neck. Ideally, when the cap is used in the manner described hereinafter, this venting will be a controlled, metered venting of the fuel vapor with the fuel vapor being directed away from the operator.

Fuel caps that rotatably engage threads, cam surfaces, or the like in the filler neck of vehicles are now widely used because of their ease of installation and removal, and because of their excellent sealing characteristics. Therefore, it would be advantageous to provide a fuel cap that will enable the fuel tank to be vented in a controlled manner upon rotation of the cap in the cap-removal direction to allow the fuel vapor to be vented before the cap is removed.

Most conventional fuel caps include a primary seal that is adapted to engage a sealing lip on the filler neck when the cap is rotated fully in the cap installation direction. These conventional fuel caps generally have an outer cover that is configured to be gripped by the operator to rotate the cap. Because unseating of the primary seal can result in a surge of fuel and fuel vapor from the filler neck in warm or hot weather, or after the vehicle has been running, it would also be advantageous to provide a fuel cap that enables fuel vapor to be vented from the tank in a controlled manner upon rotation of the outer cover before the seal between the primary seal and the filler neck is broken.

It is therefore one object of the present invention to provide a fuel cap that will enable fuel vapor to be vented from the fuel tank before the fuel cap is removed from the filler neck.

Another object of the present invention is to provide a fuel cap that will enable fuel vapor to be vented from the tank automatically during a portion of the cap-removal procedure.

Yet another object of the present invention is to provide a fuel cap that will enable fuel vapor to be vented from the tank in a controlled manner while maintaining the primary seal between the fuel cap and the filler neck.

Still another object of the present invention is to provide a fuel cap having a controlled release fuel vapor venting system that enables fuel vapor to be dissipated during cap removal so as to reduce the concentration of fuel vapor in the local region surrounding the filler neck, as well as reduce the risk of expulsion of fuel from the filler neck.

Yet another object of the present invention is to provide a fuel cap having a controlled release fuel vapor venting system that is easily adapted for use in a cam-on fuel cap, and, in particular, is sufficiently compact to fit in a small space underneath the handle shell of the cap while using a minimum of parts.

One further object of the invention is to provide a fuel cap having a handle shell configured to include a cam system for moving a plunger situated between the handle shell and a companion filler neck closure to a position actuating a valve provided in the closure to vent fuel vapor from the filler neck to the atmosphere in a controlled manner in response to sufficient rotation of the handle shell in a cap-removal direction.

According to the present invention, a fuel cap is provided for use in a fuel system filler neck having a mouth. The cap includes means for engaging the filler neck, which engaging means is formed to include a filler neck venting passageway open to the atmosphere, and means for normally closing the filler neck venting passageway. The cap further includes means for selectively actuating the closing means to open the filler neck venting passageway and means for selectively rotating the engaging means relative to the filler neck in at least a cap-removal direction. The rotating means includes means for moving the actuating means against the closing means so that the closing means is moved from a passageway-closing position to a passageway-opening position upon rotation of the rotating means in the cap-removal direction prior to rotation of the engaging means.

In preferred embodiments, the moving means includes at least one cam depending from the rotating means and the actuating means includes at least one cam follower in engagement with the at least one cam. The at least one cam is cylindrical to define an axis of rotation aligned with the axis of rotation of the cap itself. Each cylindrical cam is configured to impart rectilinear movement to the actuating means in response to rotation of the cam about its axis of rotation during rotation of the rotating means in the cap-removal direction. Using this configuration, the direction of motion of the actuating means is substantially parallel to the axis of rotation of the cam and the fuel cap.

The engaging means includes a closure member configured to close the filler neck, and an inner surface defining a first venting aperture through the closure member and providing a valve seat surrounding the venting aperture. The closing means includes a pressure-relief valve formed to include a second venting aperture, a vacuum-relief valve positioned in the second venting aperture, and means for yieldably biasing the pressure-relief valve in an axially inward direction against the valve seat normally to close the first venting aperture and also for yieldably biasing the vacuum-relief valve in an axially outward direction against the pressure-relief valve normally to close the second venting aperture.

The actuating means includes a plunger axially movable in the engaging means to a vacuum-relief valve-actuating position moving the vacuum-relief valve against the biasing means upon movement of the actuating means to an actuating position. Such movement operates to open the second venting aperture in response to rotation of the rotating means relative to the filler neck.

The actuating means further includes means for blocking rotation of the plunger during axial movement toward its vacuum-relief valve-actuating position and spring means for yieldably biasing the plunger away from its vacuum-relief valve-actuating position. Preferably, the blocking means is configured to interconnect the plunger and the engaging means and the spring means acts to maintain the at least one cam follower in engagement with the at least one cam.

The engaging means includes seal means for establishing a seal with the filler neck to block the escape of fuel and fuel vapor in the filler neck to the atmosphere and a closure lid situated intermediate the seal means and the rotating means. The rotating means is an exterior handle shell and further includes means for applying a torque to the closure lid after a predetermined amount of relative movement of the shell and the filler neck to establish a "lost-motion" connection between the engaging means and the rotating means. This lost-motion connection delays breaking the seal provided by the seal means until after said predetermined amount of relative movement of the shell and the filler neck has occurred.

One feature of the present invention is the provision on the rotating means of means for moving the actuating means to actuate the closing means and open the filler neck venting passageway. In the illustrated embodiment, a handle shell serves as rotating means and includes a cam structure depending from the underside of the shell to provide moving means connected to the actuating means. Advantageously, such an economy of structure permits construction of a compact fuel cap easily configured as, for example, either a thread-on or a cam-on filler neck closure without sacrificing desirable filler neck venting control features.

Another feature of the present invention is the configuration of the moving means in the form of at least one cam depending from the rotating means so as to engage a companion cam follower formed on the actuating means. This design is well-suited for manufacturing since it is highly economical and cost-efficient to mold or otherwise produce fuel cap components which perform the required rotating and actuating functions and also include the foregoing cams and cam followers. In particular, a cylindrical cam is easily assimilated into the operating environment of a rotatable fuel cap because of its arcuate shape and axis of rotation which is capable of converting rotational cap-removing movement into, for example, axial closing means-actuating movement in cooperation with a cam follower on the actuating means.

Yet another feature of the present invention is the configuration of the actuating means as a movable plunger for actuating a vacuum-relief valve comprising a portion of the closing means to open the filler neck venting passageway. Advantageously, this feature is easily adapted to existing fuel caps having vacuum-relief valves.

Additional objects, features, and advantages of the invention will become apparent to those skilled in the art upon consideration of the following detailed description of preferred embodiments exemplifying the best mode of carrying out the invention as presently perceived.

DETAILED DESCRIPTION OF THE DRAWINGS

Figure 1:
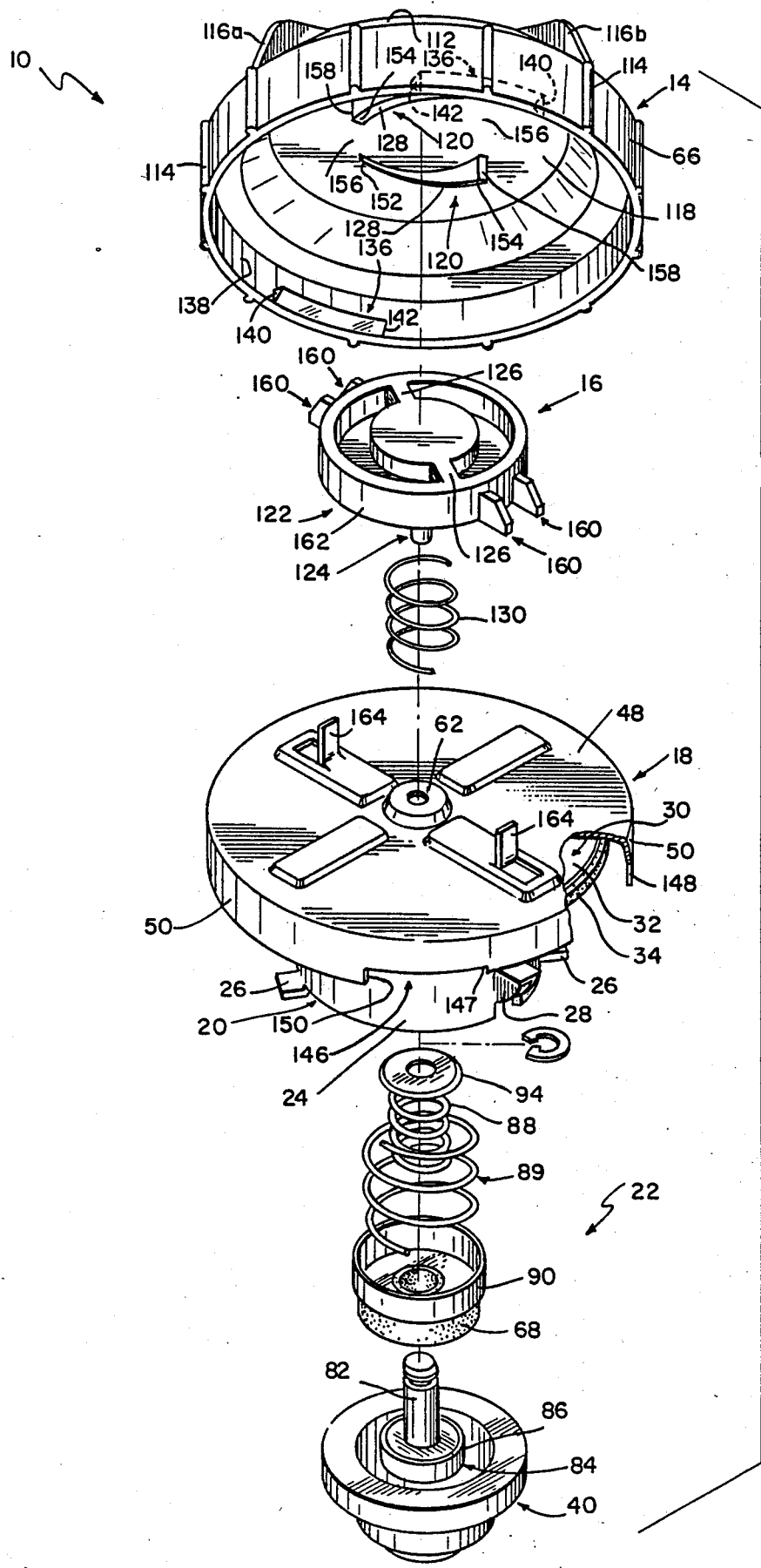
FIG. 1 is an exploded assembly view in perspective of a preferred embodiment of a fuel cap in accordance with the present invention.
Figure 2:
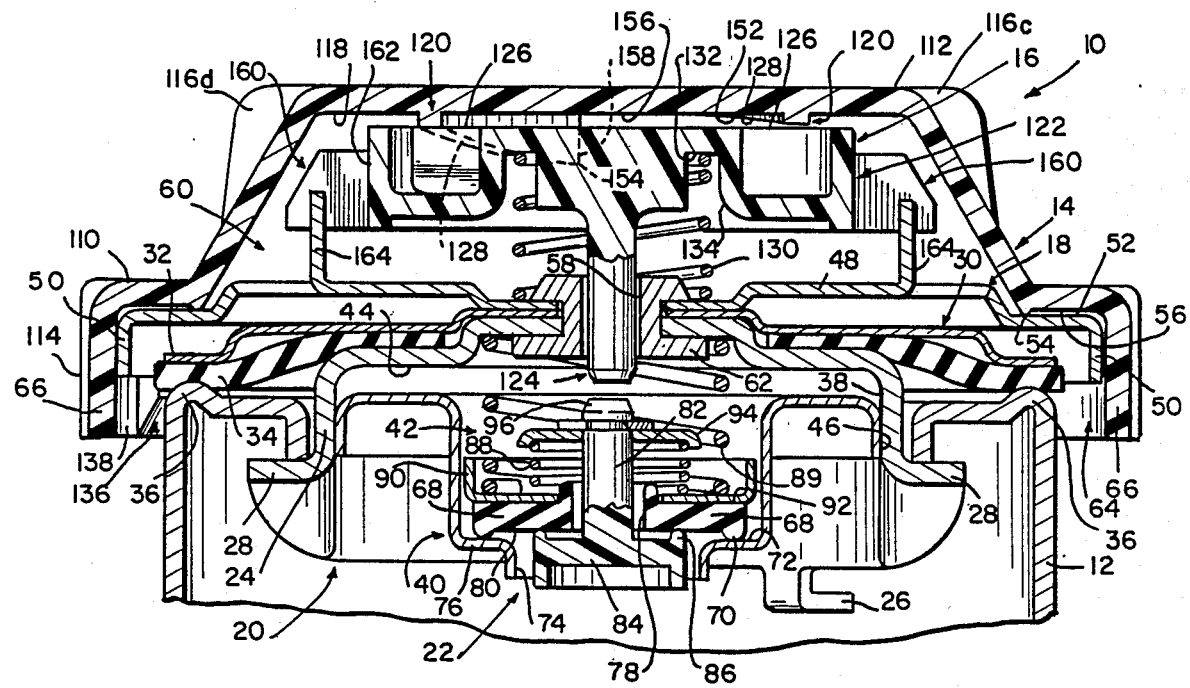
FIG. 2 is a transverse sectional view of the fuel cap of FIG. 1 fully assembled showing a vacuum-relief valve in its normally closed position.
Figure 3:
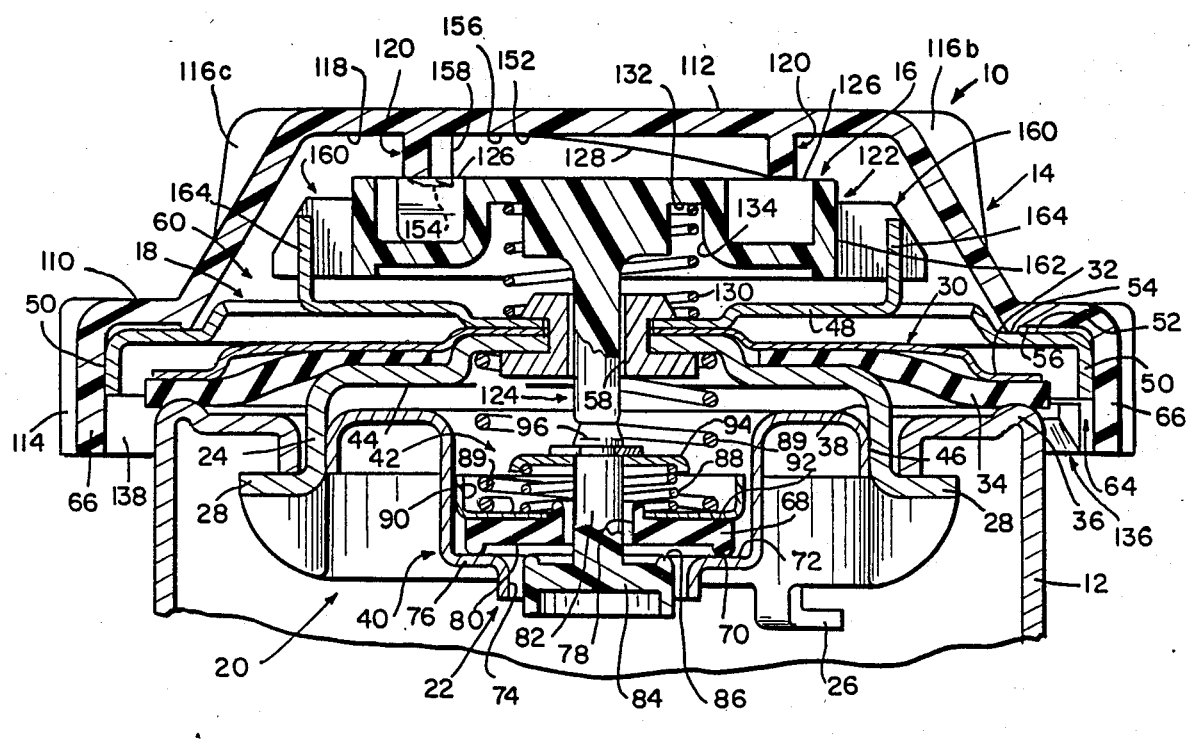
FIG. 3 is a view similar to that of FIG. 2 showing the effect of downward movement of a plunger to actuate the vacuum-relief valve in response to rotation of the outer shell in a cap-removal direction without breaking the primary seal provided between the cap and the filler neck.

A pressure-release fuel cap 10 for closing a filler neck 12 of a vehicle or other fuel system is illustrated in FIGS. 1-3. An actuation system within the fuel cap 10 enables fuel vapor pressure in the filler neck 12 to be vented in response to rotation of a portion of cap 10 relative to filler neck 12 prior to removal of the fuel cap 10 from the filler neck 12. A deflection system diffuses pressurized fuel vapor vented from fuel neck 12 in directions generally away from a person gripping the cap 10 in response to rotation of cap 10 in the cap-removal direction. Such actuation and deflection systems advantageously enable fuel vapor to be vented in a controlled manner.

Referring to FIG. 1, fuel cap 10 includes a shell 14, a plunger 16, a closure lid 18, a closure member 20, and a pressure-vacuum valve assembly 22. The closure member 20 has an axially inwardly extending shank portion 24 which is provided with pairs of conventional circumferentially spaced-apart first and second cam lugs 26 and 28. These cam lugs 26, 28 operate in the customary way to engage a filler neck configured to receive a cam-on cap and retain the cap in a fully tightened position thereon to close the open mouth of the filler neck. Alternatively, closure member 20 could be threaded to engage a threaded filler neck or otherwise configured to connect to a filler neck of compatible configuration.

A radially outwardly extending resilient annular flange 30 is provided between closure lid 18 and closure member 20 and includes an outer shoulder 32 for urging an annular sealing gasket 34 against an upper lip 36 of filler neck 12. The gasket 34 cooperates with the shoulder 32 and upper lip 36 to seal the filler neck 12 so that fuel and fuel vapor are unable to escape from a fuel tank (not shown) around closure member 20 in the space between closure lid 18, closure member 20, and filler neck 12 as long as fuel cap 10 is properly mounted on filler neck 12.

Closure member 20 has an inverted cup shape and includes an annular interior side wall 38 on which is mounted an annular funnel-shaped valve housing 40 as shown best in FIGS. 2 and 3. Valve housing 40 is sized to receive the pressure-vacuum valve assembly 22 therein in a space 42 provided between valve housing 40 and the overlying top interior wall 44 of closure member 20. Valve housing 40 includes an annular exterior side wall 46 for mating with the interior side wall 38 of closure member 20.

Closure lid 18 includes a top wall 48 that extends radially outwardly beyond the outermost edges of annular flange 30 and gasket 36 as shown best in FIGS. 2 and 3. Closure lid 18 also includes a side wall 50 depending from the perimeter of top wall 48 to surround annular flange 30 and gasket 36. Top wall 48 includes an outer annular surface 52 for engaging an annular ridge 54 depending from an interior wall 56 of shell 14.

Venting aperture 58 is provided to communicate fuel vapor discharged into space 42 by pressure-vacuum valve assembly 22 to a chamber 60 provided by the hollowness of shell 14. A rivet or plug 62 is formed to include a through passageway which serves as venting aperture 58 in the illustrated embodiment. The rivet 62 is inserted into an aperture defined by concentrically aligning a central hole formed in each of the closure lid 18, flange 30, and closure member 20 as shown in FIGS. 2 and 3 so that venting aperture 58 is properly positioned within cap 10. Rivet 62 also acts to clamp top interior wall 44 of closure member 20, annular flange 30, and top wall 48 of closure lid 18 together. In so doing, gasket 34 is trapped between radially outer portions of annular flange 30 and closure member 20 as shown in FIGS. 2 and 3.

Fuel vapor discharged into shell chamber 60 through venting aperture 58 exits cap 10 through a radially extending first space defined between surface 52 and wall 56 and also by an axially extending, annular second space 64 orthogonal to the first space and defined between radially outwardly facing surfaces of side wall 50 of closure lid 18 and annular lip 40 of filler neck 12, and a lower peripheral rim or side wall 66 of shell 14. Discharged fuel vapor is advantageously diffused as it is vented toward the exterior surface of filler neck 12 in a direction generally away from a person manually operating cap 10 during cap removal for inspection or refueling. It will be understood that fuel vapor discharged from filler neck 12 through cap 10 is conducted along a tortuous vent path defined, in part, by the internal components in cap 10 to bypass the seal provided by gasket 34 in a controlled manner.

The pressure-vacuum valve assembly 22 is installed in the space 42 provided between the closure lid 18 and closure member 20. Assembly 22 aids in controlling the flow of fuel vapors at a predetermined rate through the closure assembly provided by closure member 20 and closure lid 18 and controls venting of pressure and relief of vacuum which develop within the fuel tank to the atmosphere while cap 10 is mounted on filler neck 12. Assembly 22 includes a circular pressure-release valve 68 including a circular, axially inwardly facing rim 70 which seats against a valve seat 72 surrounding a venting opening 74 provided in a bottom wall 76 of valve housing 40. The pressure-release valve 68 includes a central circular aperture 78. In a preferred embodiment, an inner surface 80 of valve member 68 is exposed to fuel vapor pressure within the fuel tank.

An axially outwardly extending guiding stem portion 82 of a vacuum-relief valve member 84 is received in aperture 78, holding vacuum valve member 84 in alignment in valve assembly 22. The valve member 84 includes an annular, axially outwardly facing valve edge 86 which cooperates with a seat region on the inner surface 80 of the pressure-release valve member 68 normally to block flow through aperture 78. Vacuum valve member 84 is held against the axially inner surface 80 by a control spring 88 acting between a support member 90 fixed to an axially outwardly facing surface 92 of pressure-release valve 68 and a fixture member 94 fixed to the distal end 96 of stem portion 82.

Control spring 88 has a predetermined spring constant which allows vacuum valve member 84 to be urged in opposition to control spring 88 in response to predetermined subatmospheric pressure within the fuel tank (not shown) to open the aperture 78 and allow air to pass through space 42 into the fuel tank. Control spring 89 acts to bias the pressure-relief valve 68 against valve seat 72 on the valve housing 40 normally to close the venting opening 74. In its closed position, the pressure-release valve 68 provides a seal between the valve seat 72 and the sealing rim 78 until pressure in the fuel tank reaches a predetermined superatmospheric pressure. Such a pressure level gives rise to an axially outward force which acts against the axially inner surface 80 of pressure-release valve 68. Responding to this force, the valve 68 is urged axially outwardly in opposition to control spring 89 to open a venting passageway through closure base 20. Axially outward movement of pressure-release valve 68 can occur relatively quickly in order to open the venting passageway rapidly.

Referring to FIGS. 1–3, it will be appreciated that shell 14 and closure lid 18 cooperate to provide a lost-motion driving connection between the shell 14 and the closure member 20 because of the lost motion between shell 14 and closure lid 18 and the fact that closure lid 18 is rigidly fixed to closure member 20 by means of rivet 62. This lost-motion connection provided in cap 10 cooperates with plunger 16 to establish means for actuating the vacuum-relief valve member 84 in a delayed manner in response to rotation of the shell 14 in the cap-removal direction. Such delayed actuation enables the fuel vapor pressure in the filler neck 12 and the fuel tank (not shown) to be normalized during rotation of fuel cap 10 but prior to removal of the fuel cap 10 from the filler neck 12. In operation, valve member 84 is urged against control spring 88, as shown in FIG. 3, thereby opening aperture 78 in pressure-release valve member 68 to enable the fuel vapor in the filler neck 12 to be vented without substantially rotating closure member 20 relative to filler neck 12 and breaking the seal provided by gasket 34 because of the lost-motion connection.

Shell 14 is hollow and provides two sets of hand grips enabling a person easily to grip and rotate fuel cap 10 manually. Shell 14 includes a top exterior surface 110 configured to provide a raised operating handle dome 112. The side wall 66 of shell 14 depends from the peripheral edge of top surface 110. Side wall 66 is formed to include a plurality of circumferentially spaced ribs 114, thereby providing an easily gripped first set of relatively small hand grips about the circumference of shell 14. A plurality of circumferentially spaced fins are also provided about the periphery of handle dome 112 and connected to top wall 110 to provide additional ribs 116, fewer in number and larger in size than ribs 114, thereby providing a second set of relatively large hand grips.

Handle dome 112 includes a top interior wall 118 which is Presented toward plunger 16 and closure lid 18 upon assembly of cap 10 as shown in FIGS. 2 and 3. A pair of arcuate, helical ramps 120 depend from top interior wall 118 and are situated in radially outwardly spaced relation from the center of top interior wall 118. These helical ramps 120 extend in an axially downward direction from the top interior wall 118 to contact plunger 16 in a manner to be described hereinafter.

Plunger 16 provides the operative link which couples the shell 14 to the vacuum valve member 84 so that the vacuum valve member 84 is actuated to open aperture 78 in the pressure-release valve 68 and vent the fuel tank in response to sufficient rotation of shell 14 in the cap-removal direction. Plunger 16 includes a body member 122 and a valve-biasing member 124 depending from the underside of body member 122 as shown best in FIGS. 2 and 3.

Body member 122 of plunger 16 includes a pair of flat-faced cam followers 126 for riding on the camming surfaces 128 provided by helical ramps 120. Cam followers 126 extend along a diameter of the circular body member 122 as shown best in FIG. 1 and are presented toward the camming surfaces 128 so that a smooth camming engagement can be established. A coiled spring 130 acts between the top wall 48 of closure lid 18 and an axially downwardly facing surface 132 formed on the underside of circular body member 122 to yieldably urge the plunger in an axially upward direction toward the shell 14 so that the cam followers 126 matably engage the camming surfaces 128. It will be understood that spring 130 acts to maintain cam followers 126 in engagement with camming surface 128 on cam ramps 120 at all times. Surface 132 desirably forms the innermost wall in a spring-receiving annular groove 134 formed in body member 122 to open toward closure lid 18.

Valve-biasing member 124 of plunger 16 includes a distal tip which is configured to engage the distal end 96 of stem portion 82 upon movement of plunger 16 in an axially downward direction toward the pressure-vacuum valve assembly. Venting aperture 58 has an internal diameter that is larger than the outer diameter of valve-biasing member 124 so that pressurized fuel vapor can be conducted through venting aperture 58 regardless of the position of valve-biasing member 124 therein.

A closure assembly comprising the interconnected closure lid 18 and closure member 20 are selectively rotatable relative to the filler neck 12 to loosen the filler neck seal established by gasket 34 during removal of cap 10 by means of lost-motion driving connection established between shell 14 and closure lid 18. Referring to FIG. 1, shell 14 includes first and second drive members 136 affixed to an interior wall 138 of the lower peripheral rim 66. Each drive member 136 is arcuate and extends in a radially inwardly facing direction to define a first drive surface 140 at one end and a second drive surface 142 at its other end. A predetermined arcuate distance is provided between the first drive surface 140 by one of the drive members 136 and the second drive surface 142 of the other of the drive members 136.

Closure lid 18 includes a peripheral side wall 50 which is cut away to define a pair of circumferentially spaced-apart drive member-receiving recesses 146. An auxiliary recess 147 is also provided in side wall 50 for each recess 146 as shown in FIG. 1. Each auxiliary recess 147 is sized to receive the drive member 136 in the corresponding recess 146 to establish a "locking" position of the shell 14 relative to closure assembly 18, 20, thereby advantageously limiting rattling movement of shell 14 relative to closure assembly 18, 20. Spring 130 acts between closure lid 18 and assembly 14, 16 to urge lid 18 away from shell 14 causing drive members 136 to be received in auxiliary recesses 147 upon rotation of shell 14 to a predetermined position with respect to closure lid 18.

The side wall 50 of closure lid 18 includes a first driven surface 148 at one end of each of recesses 146 and a second driven surface 150 at the other end of each of recesses 146 for mating with the drive surfaces 140, 142, respectively. Illustratively, the second driven surface 150 is situated to define an edge of the auxiliary recess 147 as shown in FIG. 1. Each recess 146 has a predetermined arcuate length greater than the arcuate length of the corresponding drive members 136.

Each drive member 136 is positioned in one of the recesses 146, 147 to provide means for imparting rotation to the closure assembly 18, 20 upon rotation of shell 14. In other words, drive members 136 act to apply a torque to the closure lid 18 after a predetermined amount of relative movement of the shell 14 and the filler neck 12 to establish a lost-motion connection between the closure 20 and the shell 14. The lost-motion connection serves to delay breaking the seal provided by gasket 34 until after the predetermined amount of relative movement between the shell 14 and the filler neck 12 has occurred. Movement of shell 14 relative to closure lid 18 is initiated by pushing shell 14 against spring 130 to release both drive members 136 from a locking position within the companion auxiliary recesses 147.

The lost-motion driving feature results from the disparity in length of each drive member 136 inside its relatively longer recess 146. This disparity enables each drive member 136 to move relative to closure lid 18 through a lost-motion zone as the shell 14 is rotated relative to filler neck 12 from: (1) a first position in which the first drive surface 140 of each drive member 136 engages the first driven surface 148 of the closure lid 18, thereby establishing a cap-removal driving connection; and (2) a second position in which the second drive surface 142 of each drive member 136 engages the second driven surface 150 of the closure lid 18, thereby establishing a cap-installation driving connection.

It is during the lost-motion stage, which stage occurs prior to engagement of the first drive and driven surfaces 140, 148 to provide a cap-removal driving connection, that the plunger 16 is moved to actuate the vacuum valve member 84 to vent the fuel tank. This lost-motion cam system is thus configured to delay rotating the closure member 20 to a position breaking the filler neck seal established by gasket 34 until after tank venting of pressurized fuel vapor through apertures 78 and 58 has occurred.

Plunger 16 is movable by means of another lost-motion driving connection with shell 14 between an inactive position illustrated in FIG. 2 and a vacuum-relief valve-actuating position illustrated in FIG. 3. The camming surfaces 128 of helical ramp 120 provide cylindrical cams for receiving flat-faced cam followers 126 and converting rotational motion of shell 14 into downward axial motion of plunger 16 toward its valve-activating position. Thus, cam ramps 120 are configured to impart rectilinear movement of the valve-actuating plunger 16 in response to rotation of the cam ramps 120 about the axis of rotation of handle shell 14 during rotation of shell 14 in the cap-removal direction. In this way, the direction of motion of plunger 16 is essentially parallel to the axis of rotation established by cam ramps 120.

Each ramp 120 includes points of lowest inclination 152 and highest inclination 154 and extends approximately 70° about the central axis of plunger 16. A substantially flat lost-motion region 156 is provided on the top interior wall 118 of shell 14 extending through an angle of approximately 90° between the point of highest inclination of one of the ramps 120 and the point of lowest inclination of the other of the ramps 120 as shown best in the perspective view of FIG. 1. Stop wall 158 extends axially upwardly from the edge of each lost-motion region 156 to the point of highest inclination 154 of the adjacent ramp 120 as seen in FIG. 1.

Plunger 16 further includes two pairs of anti-rotation blades 160. Each blade 160 includes a proximal end fixed to the annular side wall 162 of plunger 16 to cantilever the blade 160 so that its distal end extends in a radially outward direction. Closure lid 18 is formed to include two bent tabs 164 which are situated on opposite sides of rivet 62 and extend in an axially upward direction toward shell 14 so that each tab 164 is receivable in the space defined between one of the pairs of blades 160. Thus received, each tab 164 is trapped between two anti-rotation blades 160 to block rotation of plunger 16 during axial movement of plunger 16 inside cap 10. Such rotation blocking facilitates camming conversion of rotational motion of shell 14 to axial motion of plunger 16.

In operation, rotation of shell 14 in the cap-removal direction (counterclockwise in FIG. 1) operates to move vacuum-release valve 84 from its closed position shown in FIG. 2 to its open position shown in FIG. 3 to enable pressurized fuel vapor to be vented from filler neck 12 through the outlet deflector means to the atmosphere. Advantageously, the valve-actuating means 120, 126, 116 interconnecting shell 14 and valve 84, as well as the closure removal means 136, 138, 148, 18, 62 interconnecting shell 14 and closure member 20 are configured so that rotation of shell 14 in a cap-removal direction will actuate valve 84 to enable the filler neck 12 and fuel tank (not shown) to be vented through the closure member 20 and the filler neck mouth without substantially rotating the closure member 20 relative to filler neck 12 and breaking the primary seal established by gasket 34.

Delayed actuation of valve 84 is accomplished in the following manner during cap removal. Each of flat-face cam followers 126 is moved in an axially downward direction as cam followers are also moved from an initial position abutting stop 158 of ramp 120 across flat lost-motion region 156 toward the point of lowest inclination 152 of ramp 120 during initial rotation of shell 14 in the cap-removal direction. Plunger 16 is free to reciprocate along an axial displacement path relative to shell 14 even though plunger 16 is fixed against rotation in cap 10 by anti-rotation blades 160. Continued rotation of cylindrical cam surfaces 120 causes each upwardly biased cam follower 126 to ride on cam surface 120 and convert rotational motion of shell 14 to axially downward motion or displacement of plunger 16.

It will be appreciated that provision of lost-motion regions 156 effectively delay initial downward movement or displacement of plunger 16 and that the size of region 156 can be selected to "program" the period of this delay. Such a lost-motion feature between shell 14 and plunger 16 permits shell 14 to rotate through a predetermined angle (e.g., about 90° in the illustrated embodiment) relative to filler neck 12 (or vice versa) without establishing an operative connection with the venting means 84. Such a feature advantageously improves the crashworthiness of fuel cap 10 in that the shell 14 can be rotated at least a predetermined amount as a result of impact during a vehicle rollover or other crash without opening a normally closed aperture in a pressure-vacuum valve assembly 22 which might lead to the escape of liquid fuel to the atmosphere through closure member 20.

It will be understood that the first and second drive members 140, 142 on shell 14 can be used to delay establishment of a driving connection between shell 14 and the closure member 20 irrespective of the inclusion of plunger 16 in fuel cap 10. Thus, provision of a lost-motion connection between the shell 14 and the closure member 20 is applicable to rotatable fuel caps to improve their crashworthiness whether or not such caps have pressure-relief vacuum valve assemblies.

In addition, the lost-motion feature between shell 14 and closure lid 18 and the configuration of cam ramps 120 are coordinated to sustain venting of fuel vapor past vacuum-relief valve 84 during continued rotation of shell 14 through a remaining part of the initial portion of the rotation of shell 14 in its cap-removal direction. Such sustained venting occurs before the shell 14 is coupled to the closure member 20 to disengage the closure member 20 from the filler neck 12.

Although the invention has been described in detail with reference to a preferred embodiment, variations and modifications exist within the scope and spirit of the invention as described and defined in the following claims.

What is claimed is:

1. A fuel cap for use in a fuel system filler neck having a mouth, the cap comprising
    means for engaging the filler neck, the engaging means providing a filler neck venting passageway open to the atmosphere,
    means for normally closing the filler neck venting passageway,
    means for selectively actuating the closing means to open the filler neck venting passageway, and
    means for selectively rotating the engaging means relative to the filler neck in at least a cap-removal direction, the rotating means including means for moving the actuating means against the closing means so that the closing means is moved from a passageway-closing position to a passageway-opening position upon rotation of the rotating means in the cap-removal direction prior to rotation of the engaging means.

2. The cap of claim 1, wherein the moving means includes at least one cam depending from the rotating means and the actuating means includes at least one cam follower in engagement with the at least one cam.

3. The cap of claim 2, wherein the at least one cam is cylindrical to define an axis of rotation and is configured to impart rectilinear movement to the actuating means in response to rotation of the at least one cylindrical cam about its axis of rotation during rotation of the rotating means in the cap-removal direction so that the direction of motion of the actuating means is substantially parallel to the axis of rotation of the at least one cylindrical cam.

4. The cap of claim 1, wherein the rotating means and the engaging means cooperate to define outlet-deflector means for discharging fuel vapor vented through the engaging means via the filler neck venting passageway from the cap to a region outside of the filler neck in a direction toward the filler neck and generally away from a person manually rotating the rotating means.

5. The cap of claim 1, wherein the engaging means includes a closure member configured to close the filler neck and an inner surface defining a first venting aperture through the closure member and providing a valve seat surrounding the venting aperture, the closing means includes a pressure-relief valve formed to include a second venting aperture, a vacuum-relief valve positioned in the second venting aperture, and means for yieldably biasing the pressure-relief valve in an axially inward direction against the valve seat normally to close the first venting aperture and for yieldably biasing the vacuum-relief valve in an axially outward direction against the pressure-relief valve normally to close the second venting aperture, and the actuating means includes a plunger axially movable in the engaging means to a vacuum-relief valve-actuating position moving the vacuum-relief valve against the biasing means upon movement of the actuating means to an actuating position to open the second venting aperture in response to rotation of the rotating means relative to the filler neck.

6. The cap of claim 5, wherein the actuating means further includes means interconnecting the plunger and the engaging means for blocking rotation of the plunger during axial movement toward its vacuum-relief valve-actuating position.

7. The cap of claim 5, wherein the actuating means further includes spring means for yieldably biasing the plunger away from its vacuum-relief valve-actuating position.

8. The cap of claim 7, wherein the moving means includes at least one cam depending from the rotating means, the actuating means further includes at least one cam follower, and the spring means acts to maintain the at least one cam follower in engagement with the at least one cam.

9. The cap of claim 1, wherein the engaging means includes seal means for establishing a seal with the filler neck to block the escape of fuel and fuel vapor in the filler neck to the atmosphere and a lid situated intermediate the seal means and the rotating means, and the rotating means further includes means for applying a torque to the lid after a predetermined amount of relative movement of the shell means and the filler neck to establish a lost-motion connection between the engaging means and the rotating means to delay breaking the seal provided by the seal means until after said predetermined amount of relative movement of the rotating means and the filler neck has occurred.

10. A fuel cap for use in a fuel system filler neck having a mouth, the cap comprising
closure means rotatably engaging the filler neck for closing the filler neck, the closure means including means for selectively establishing a passage extending through the closure means to interconnect an interior region of the filler neck and atmosphere surrounding the filler neck in fluid communication,
means for extending into the closure means for actuating the establishing means, the actuating means being movable relative to the closure means between inactive and actuating positions, and
shell means for providing a hand grip to permit rotation, the shell means including means for moving the actuating means to its actuating position in response to rotation of the shell means relative to the filler neck in a cap-removal direction without substantially rotating the closure means relative to the filler neck.

11. The cap of claim 10, wherein the moving means includes at least one cam depending from the shell means and the actuating means includes at least one cam follower in engagement with the at least one cam.

12. The cap of claim 11, wherein the at least one cam is cylindrical to define an axis of rotation and is configured to impart rectilinear movement of the actuating means in response to rotation of the at least one cylindrical cam about its axis of rotation during rotation of the shell means in the cap-removal direction so that the direction of motion of the actuating means is substantially parallel to the axis of rotation of the at least one cylindrical cam.

13. The cap of claim 10, wherein the shell means and the closure means cooperate to define outlet-deflector means for discharging fuel vapor vented through the closure means via the establishing means from the cap to a region outside of the filler neck in a direction toward the filler neck and generally away from a person manually rotating the shell means.

14. The cap of claim 10, wherein the closure means includes an inner surface defining a first venting aperture and providing a valve seat surrounding the venting aperture, the establishing means includes a pressure-relief valve formed to include a second venting aperture, a vacuum-relief valve positioned in the second venting aperture, and means for yieldably biasing the pressure-relief valve in an axially inward direction against the valve seat normally to close the first venting aperture and for yieldably biasing the vacuum-relief valve in an axially outward direction against the pressure-relief valve normally to close the second venting aperture, and the actuating means includes a plunger axially movable in the closure means to a vacuum-relief valve-actuating position moving the vacuum-relief valve against the biasing means upon movement of the actuating means to its actuating position to open the second venting aperture in response to rotation of the shell means relative to the filler neck.

15. The cap of claim 14, wherein the actuating means further includes means interconnecting the plunger and the closure means for blocking rotation of the plunger during axial movement toward its vacuum-relief valve-actuating position.

16. The cap of claim 14, wherein the actuating means further includes spring means for yieldably biasing the plunger away from its vacuum-relief valve-actuating position.

17. The cap of claim 16, wherein the moving means includes at least one cam depending from the shell means, the actuating means further includes at least one cam follower, and the spring means acts to maintain the at least one cam follower in engagement with the at least one cam.

18. The cap of claim 10, wherein the closure means includes seal means for establishing a seal with the filler neck to block the escape of fuel and fuel vapor in the filler neck to the atmosphere and a lid situated intermediate the seal means and the shell means, and the shell means further includes means for applying a torque to the lid after a predetermined amount of relative movement of the shell means and the filler neck to establish a lost-motion connection between the closure means and the shell means to delay breaking the seal provided by the seal means until after said predetermined amount of relative movement of the shell means and the filler neck has occurred.

19. The cap of claim 18, the actuating means includes a plunger axially movable in an aperture formed in the lid and the lid includes means for blocking rotation of the plunger during axial movement of the plunger relative to the closure means.

20. The cap of claim 18, wherein the establishing means includes a venting aperture and vacuum-relief valve means for selectively admitting ambient air into the filler neck through the venting aperture when vacuum conditions exceed a predetermined amount, and the actuating means includes a plunger axially movable in an aperture formed in the lid toward the vacuum-relief valve means to actuate the actuating vacuum-relief valve means in response to rotation of the shell means relative to the filler neck prior to application of a rotation-inducing torque to the closure means to permit pressurized fuel vapor to be vented through the venting aperture without breaking the seal established by the seal means.

21. The cap of claim 18, wherein the shell means, the plunger, and an exterior surface of the lid cooperate to define bypass means for conducting pressurized fuel vapor along a tortuous path bypassing the seal means from the venting aperture to the atmosphere, and the shell means is configured to define outlet means for discharging vented fuel vapor conducted via the bypass means in a direction toward the filler neck so that fuel vapor vented through the fuel cap along the tortuous path is discharged in a direction generally away from a person rotating the shell means during removal of the cap from the filler neck.

22. A fuel cap for use in a fuel system filler neck having a mouth, the cap comprising
closure means for engaging and closing the filler neck,
vent path means for providing a controllable vent path through said closure means,
means for opening said vent path means to permit fuel vapor in said fuel system to vent out of said filler neck through said filler neck mouth upon movement of the opening means relative to the closure means from an inactive position to an actuating position, and
shell means for selectively rotating said closure means relative to said filler neck, the shell means including means for camming the opening means to impart motion to the opening means upon rotation of the shell means in a selected direction preparatory to rotating the closure means within the filler neck so that the opening means is moved relative to the closure means to its actuating position to open the vent path means.

23. The cap of claim 22, wherein said opening means comprises a plunger configured to move axially within said closure means.

24. The cap of claim 23, wherein said camming means includes at least one cylindrical cam for axially displacing said plunger within said closure means in response to rotational movement of said shell means.

25. The cap of claim 24, wherein said vent path means includes a vent passageway and a pressure-vacuum valve in the vent passageway.

26. The cap of claim 25, wherein said plunger is configured to displace a portion of said pressure-vacuum valve when said plunger is moved axially downwardly by said at least one cylindrical cam to release said fuel vapor from said fuel tank.

27. The cap of claim 26, wherein said shell means is configured to rotate freely around said closure means during an initial portion of the rotation in the first direction followed by engaging rotation with respect to said closure means to engage said closure means with said filler neck, and said shell means is configured to rotate freely around said closure means during an initial portion of the rotation in the direction opposite said first direction followed by engaging rotation with respect to said closure means to disengage said closure means from said filler neck.

28. The cap of claim 27, wherein said shell means and said at least one cylindrical cam cooperate to move said plunger axially downwardly to displace a portion of said pressure-vacuum valve during a predetermined part of the initial portion of the rotation of said shell means in the direction opposite said first direction to permit said fuel vapor to begin venting, and said shell means and said at least one cylindrical cam also cooperate to provide means for sustaining a venting of the fuel vapor during continued rotation of the shell means through a remaining part of the initial portion of the rotation in the direction opposite said first direction and before said shell means is coupled to said closure means to disengage said closure means from said filler neck.

29. A fuel cap rotatably engageable with a fuel system filler neck having a mouth, the fuel cap comprising
closure means including a closure member rotatably engaging the filler neck,
seal means for establishing a fuel vapor seal between the closure member and the filler neck,
a handle rotatable between a cap-retaining position and a cap-removing position, the handle including an interior surface and at least one cam member depending from the interior surface,
actuation means responsive to a force applied by the cam member upon rotation of the handle in a cap-removal direction for creating a fuel vapor-conducting vent path between the filler neck and the atmosphere through the sealed closure means, the actuation means maintaining the seal established by the seal means during a predetermined amount of rotation of the handle in a cap-removal direction from its cap-retaining position to accommodate discharge of fuel vapor through the vent path prior to breaking the seal established by the seal means.

30. The fuel cap of claim 29, wherein the handle and the closure means cooperate to define deflector means for directing fuel vapor discharged through the vent path by the actuation means toward an exterior surface of the filler neck and generally away from a person rotating the handle in the cap-removal direction.

31. The fuel cap of claim 29, wherein the handle further includes drive means for applying a rotation-inducing torque to the closure means during continued rotation of the handle past said predetermined amount of rotation, the drive means establishing a lost-motion connection between the handle and the closure means to delay rotation of the closure means relative to the filler neck and breakage of the seal established by the seal means until after the pressure in the filler neck has substantially normalized due to discharge of pressurized fuel vapor through the vent path.

32. The fuel cap of claim 29, wherein the actuation means includes at least one cam follower in engagement with the at least one cam member and the at least one cam member is a cylindrical cam.

33. The fuel cap of claim 32, wherein the actuation means further includes a plunger having at least one cam follower and means acting against the closure means for biasing the plunger to maintain the at least one cam follower in engagement with the at least one cam member.

34. The fuel cap of claim 29, wherein the closure means includes an inner surface defining a first venting aperture and providing a valve seat surrounding the venting aperture, the establishing means includes a pressure-relief valve formed to include a second venting aperture, a vacuum-relief valve positioned in the second venting aperture, and means for yieldably biasing the pressure-relief valve in an axially inward direction against the valve seat normally to close the first venting aperture and for yieldably biasing the vacuum-relief valve in an axially outward direction against the pressure-relief valve normally to close the second venting aperture, and the actuation means includes a plunger axially movable in the closure means to a vacuum-relief valve-actuating position moving the vacuum-relief valve against the biasing means upon movement of the actuation means to its actuating position to open the second venting aperture in response to rotation of the handle relative to the filler neck.

35. The fuel cap of claim 34, wherein the actuation means further includes means interconnecting the plunger and the closure means for blocking rotation of the plunger during axial movement toward its vacuum-relief vale-actuating position.

36. A fuel cap for use in a fuel system filler neck having a mouth, the cap comprising
a closure rotatably engageable with the filler neck to cover the filler neck mouth and formed to include a vent passageway extending therethrough in communication with the filler neck,
a valve supported in the vent passageway for movement between passageway-opening and passageway-closing positions,
a handle shell including drive member positioned to apply a rotation-inducing drive force to the closure upon rotation of the handle shell, and
a plunger supported in a space between the handle shell and the closure for movement between inactive and valve-actuating positions, the handle shell including at least one cam member configured to move the plunger to its valve-actuating position upon rotation of the handle shell in a cap-removal direction, thereby moving the valve to its passageway-opening position.

37. The fuel cap of claim 36, wherein the valve is a vacuum-relief valve.

38. The fuel cap of claim 36, further comprising a lid intermediate the closure and the handle shell, the lid being fixed to the closure and including a driven member, the closure including a sealing ring for engaging the filler neck at its mouth, the drive member of the handle shell and the driven member of the lid being movable relative to one another upon rotation of the handle shell in a cap-removal direction to establish a lost-motion connection between the closure and the handle shell to delay movement of the closure away from the filler neck and the sealing ring prior to engagement of the drive member with the driven member to apply a rotation-inducing torque to the lid, thereby loosening the cap on the filler neck.

39. The fuel cap of claim 38, wherein the at least one cam member is a cylindrical cam fixed on the handle shell and configured to define a predetermined displacement upon rotation of the handle shell about the axis of rotation of the cylindrical cam, the cylindrical cam has an axis of rotation, a base, and a lowermost portion spaced apart from the base to define the predetermined displacement and engage the plunger, and the cylindrical cam is situated in predetermined alignment to the drive member causing the lowermost portion of the cylindrical cam to lead a forwardmost driven member-engaging portion of the drive member so that the plunger is moved by the cylindrical cam to its valve-actuating position in response to rotation of the handle shell prior to transmission of a rotation-inducing torque from the handle shell to the closure upon engagement of the forwardmost driven member-engaging portion of the drive member and the driven member.

40. The fuel cap of claim 36, wherein the plunger includes a cam follower for riding on the at least one cam member and a spring acting between the plunger and the closure to urge the cam follower into camming engagement with the at least one cam member on the handle shell.

* * * * *